United States Patent [19]
Ellefson et al.

[11] 3,892,974
[45] July 1, 1975

[54] UNITARY FLEXIBLE CIRCUIT FOR PEN READER

[75] Inventors: Larry P. Ellefson; John Renn, both of Seattle, Wash.

[73] Assignee: Interface Mechanisms, Inc., Seattle, Wash.

[22] Filed: Dec. 28, 1973

[21] Appl. No.: 429,656

[52] U.S. Cl. .......................... 250/568; 235/61.11 E
[51] Int. Cl. .......................... G01n 21/30
[58] Field of Search ...... 235/61.11 E; 250/566, 568, 250/567; 340/146.3 SY

[56] References Cited

UNITED STATES PATENTS

| | | | |
|---|---|---|---|
| 3,042,806 | 7/1962 | Lubin | 250/568 |
| 3,328,591 | 6/1967 | Jones | 250/566 |
| 3,581,100 | 5/1971 | Milford | 250/568 |
| 3,676,690 | 7/1972 | McMillin | 235/61.11 E |
| 3,693,019 | 9/1972 | Grenda | 235/61.11 E |
| 3,748,483 | 7/1973 | Englund | 235/61.11 E |
| 3,774,015 | 11/1973 | Lockard | 235/61.11 E |
| 3,784,794 | 1/1974 | Allais | 235/61.11 E |

*Primary Examiner*—James W. Lawrence
*Assistant Examiner*—D. C. Nelms
*Attorney, Agent, or Firm*—Christensen, O'Connor, Garrison, & Havelka

[57] ABSTRACT

A circuit for use in reading bar codes or the like in which certain reader components are arranged in a flexible unitary structure for convenient placement in a reader housing. A light-emitting diode is supported by a plurality of thin conductive connections to two flexible conductive strips. These conductive strips are encased with or otherwise attached to other spaced flexible conductor strips forming connections for a phototransistor and additional conventional reader circuit elements in a flexible protective plastic, resulting in a unitary circuit structure which may be conveniently placed in a reader housing and oriented with respect to the housing elements for proper operation. Connections to the circuit are provided at one end of the flexible unitary structure by means of selected conductive strips.

12 Claims, 4 Drawing Figures

UNITARY FLEXIBLE CIRCUIT FOR PEN READER

BACKGROUND OF THE INVENTION

The present invention relates generally to optical reading devices, and more specifically to those reading devices used with coded data in the form of bar codes or the like.

Optical sensing systems which read data in the form of bar codes are well-known in the art. A hand-held probe may be conveniently used to scan data which is in the form of a series of parallel spaced bars or the like. Generally, such a hand-held probe includes a light source and an associated detector, the probe differentiating between successive bars and spaces by detecting the varying amounts of light reflected therefrom and converting the detected light into corresponding voltage levels as an output signal. For providing the light generation and detection capability for such a hand-held probe, it is known in the art to utilize the combination of a light-emitting diode and a light-detecting element, such as a phototransistor or photodiode. This combination provides a reliable, rugged and inexpensive means to read such coded data.

One embodiment of such a system utilizes a light-emitting diode secured by means of a transparent adhesive to the surface of a transparent spherical member positioned at one end of the probe, the spherical member typically being a synthetic sapphire ball. In operation, the light emitted by the LED is transmitted through the sapphire ball to the surface containing the coded data, and varying amounts of light are reflected by the data. The reflected light is transmitted back through the ball and impinges on a conventional light detector, such as a phototransistor, which is disposed a given distance away from the LED inside the probe. The phototransistor ((or photodiode) and the LED are preferably coaxial with the center of the sapphire ball for maximum accuracy and reliability of the scan. The output signal produced by the circuit is then applied through an exterior connection to additional conventional circuitry for processing and retrieval.

In fabricating such a hand-held probe, however, there are frequently significant problems in achieving proper alignment of the LED on the sapphire ball, particularly in view of the small sizes involved, and correct positioning and connection of the circuit elements in the reader housing is frequently a laborious and time-consuming process.

In accordance with the above, it is therefore a general object of the present invention to overcome the disadvantages of the prior art.

It is another object of the present invention to provide a circuit for an optical reader in which the light-emitting element may be aligned simply and quickly with the center of the spherical member and the light-detecting element.

It is a further object of the present invention to provide such a circuit which includes a series of spaced electrical connections for certain reader components in a single unitary package.

It is yet another object of this invention to provide such a circuit in which the unitary package is flexible, and which substantially retains its shape when flexed in a given manner.

SUMMARY OF THE INVENTION

In accordance with the above objectives, the present invention includes a plurality of spaced relatively thin flexible conductive strips, arranged by a plastic flexible member in a predetermined spaced relationship, including connections for the light source element and the light-detecting element, as well as the other conventional reader circuit elements. This unitary flexible circuit may be easily and quickly arranged in a pen reader and aligned for proper reading operation.

DESCRIPTION OF THE DRAWINGS

The present invention can best be understood by a study of the following detailed description, taken in conjunction with the accompanying drawings in which.

DESCRIPTION OF THE PREFERRED EMBODIMENT

Figure 1:
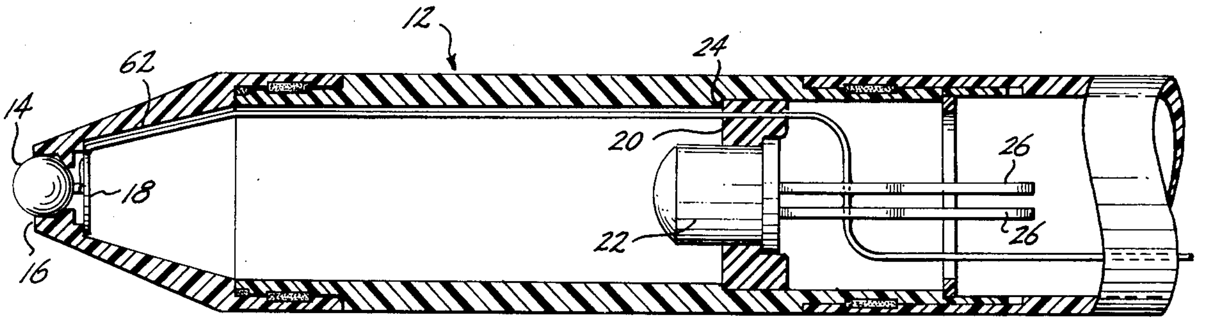
FIG. 1 is a side section view of the present invention in place in a reader probe housing.

Referring to FIG. 1, a hand-held probe of the type used with the present invention is shown generally at 12. A hard surface, transparent, spherical member 14, which is typically a synthetic sapphire ball, but may be other hard-surface materials such as glass, is shown disposed at one end 16 of the probe 12. A light-emitting diode 18 is secured in the vicinity of the probe interior surface of the sapphire ball 14 by a spider-like connecting structure (FIG. 3) which is more fully explained in following paragraphs. The connections to the connecting structure are thin flexible conductive strips, e.g., copper strips (FIG. 2) which are encased in or attached to a flexible plastic, and which in use are bent to fit generally along the interior surface of the probe. The flexible conductive plastic-encased strips are passed through an interior mounting structure 20 for the phototransistor 22 (or other light-detecting element), the mounting structure 20 being positioned against an interior shoulder 24 of the probe 12. Although in the preferred embodiment, the LED is positioned in the vicinity of the sapphire ball, and the phototransistor is positioned axially away from the ball in the housing, their positions may be reversed, although ambient light noise will tend to degrade performance.

The phototransistor 22, light-emitting diode 18 and the center point of the sapphire ball 14 are coaxially aligned. This is accomplished by careful positioning of the LED with respect to the fixed positions of the sapphire ball 14 and the phototransistor 22. Additional spaced conductive strips are provided in the unitary flexible circuit which connect to the leads 26-26 of the phototransistor 22. Additional circuit elements are provided with the unitary flexible circuit which amplifies the signals from the phototransistor 22. Exterior connections to the unitary flexible circuit are provided so that the individual circuit elements, including the LED, may be properly energized, and so that the amplified output signal may be conveniently applied to additional conventional code reader circuitry.

Figures 2, 3, 4:
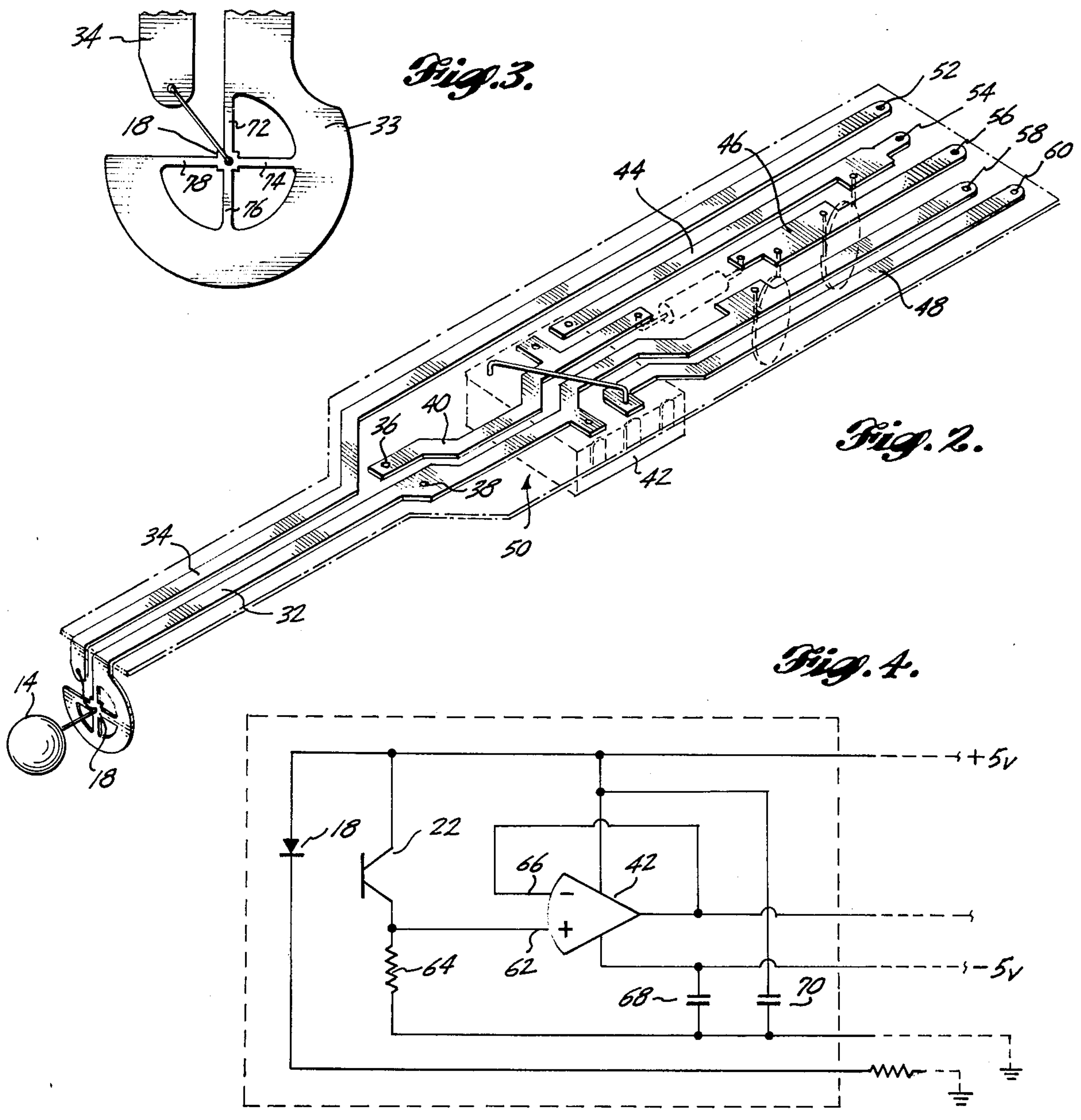
FIG. 2 is an isometric view of the present invention.
FIG. 3 is a top plan view of the LED portion of FIG. 2.
FIG. 4 is a schematic diagram of the electrical circuit used in the present invention.

Referring now to FIG. 2, the details of the unitary flexible circuit of the present invention are shown. A plurality of spaced, flexible, thin conductive strips are provided for the circuit connections. An LED 18 is positioned at the center of a spider-like connection arrangement, which will be explained in more detail in connection with FIG. 3. The anode and the cathode of the LED are connected, respectively, to conductive strips 32 and 34, conductive strip 32 being coupled to a source of electrical energy (not shown). Conductive strip connections for a phototransistor are provided at 36 and 38. Conductive strip 40 provides connection between a phototransistor and a conventional operational amplifier 42, while conductive strip 44 couples the output of amplifier 42 for exterior connection, and conductive strips 46 and 48 provide other circuit connections. All of the conductive strips are encased in or otherwise attached to a transparent flexible plastic 50 with appropriate openings provided for exterior connection to the circuit. The plastic casing 50 encloses the conductive strips in such a manner as to maintain them in a fixed spaced relationship to one another, thereby preventing electrical shorting or other interference. Exterior circuit connections 52 through 60 are provided through an opening in the plastic casing so that power can be delivered to the circuit, and so that the signals generated by the circuit may be applied to additional circuitry. Such an arrangement of flexible conductive strips providing circuit connections for elements of a hand-held reader, which strips are held in spaced relationship with one another by a flexible plastic casing, allows the entire reader circuit to be fabricated in a unitary package, and the installation and alignment of the circuitry in the reader housing may thus be significantly simplified. Although the preferred embodiment is in terms of a flexible encasing member, it is not necessary that the strips be completely encased. Attachment to a flexible backing member in the desired spaced relationship is sufficient for proper operation.

In installation, the LED 18 is coaxially aligned with the center of the sapphire ball 14 and the phototransistor 22, and the conductive strips 32 and 34 are bent at an angle of approximately 75° to the LED to conform to the interior surface of the probe. Typically, the peripheral configuration of the spider support structure for the LED will conform to the internal wall configuration of the housing in the vicinity of the sapphire ball, thus assisting positioning and alignment of the LED. A portion of the flexible circuit is secured to the interior surface in the vicinity of point 62 (FIG. 1), thus insuring a stable positioning of the flexible circuit, and hence the LED, in the probe housing. The leads 26—26 from the phototransistor 22 are inserted in their proper locations in the flexible circuit, which is bent roughly in the shape of an "S" slightly rearward of the support structure 20. Suitable exterior connections may be made with the flexible circuit at the most rearward portion of the probe housing. After initial installation, the LED and spider connecting arrangement may be adjusted axially with respect to the sapphire ball and the phototransistor to maximize performance.

Referring to FIG. 4, the electrical schematic of the circuit used with the unitary flexible connection circuit of the present invention is shown. Plus and minus 5 volts are provided for biasing the operational amplifier 42, and the light-emitting diode 18, which when energized begins to emit light. The emitted light is focused by sapphire ball 14 onto a surface containing the recorded data to be scanned (not shown). A portion of the light impinging on the data is reflected back to the sapphire ball 14, the amount of light reflected depending upon the reflecting capacity of the scanned data bit. If the scanned data bit is dark, e.g., a bar, little light is reflected, while if the scanned bit is light, e.g., a space, a relatively greater amount of light is reflected. The reflected light passes through the sapphire ball 14 and is slightly refracted thereby. Little of the returning light is blocked by the LED 18 and its associated spider connection arrangement, because of the small size of the LED and the small proportions of the spider connection relative to the surface area of the ball. The light which passes through the ball 14 impinges on the phototransistor 22, which is biased on by the 5 volt supply. The varying voltage output of the phototransistor 22 is applied to the noninverting input 62 of operational amplifier 42. The voltage level of the signal applied to operational amplifier 42, as explained above, is proportional to the quantity of light reaching the phototransistor 22 and hence, proportional to the reflectiveness of the data bit being scanned. The value of resistor 64 is chosen such that the output of phototransistor 22 is 0.1 volts ± 0.01 volts when the reader probe is held at an angle of 15° from the perpendicular to white paper.

Operational amplifier 42 is conventionally connected such that the value of the feedback voltage applied at the inverting input 66 of amplifier 42 will be equal to the voltage present at the noninverting input 62. Thus, operational amplifier 42 provides a unity gain between the noninverting input 62 and the output. Capacitors 68 and 70 are included to provide AC isolation between the bias supply and ground. The output of amplifier 42 is a varying voltage signal, characterized by relatively sharp transitions between alternating positive and negative peaks, the amplitude of the respective peaks being proportional to the amount of light reflected from the scanned data bits. Typically, the whiter the surface, the more positive the output voltage, and the darker the surface, the less positive the output voltage.

Referring now to FIG. 3, the details of the spider connection from conductive strips 32 and 34 to the LED 18 are shown. LED 18 is relatively thin-edged, otherwise substantially square in shape, and is surrounded on three sides by conductive strip 32, which is spaced away from the LED approximately one-eighth inch. Four very narrow threadlike orthogonal conductive strips 72, 73, 74 and 75 provide a connection between strip 32 and the anode of LED 18. The threadlike connecting strips 72–75 are integral with strip 32 and are bonded to the anode of the LED by conventional bonding techniques, such as epoxy or scrub bonding. Conductive strip 34, on the other hand, is configured so as to terminate in the general vicinity adjacent the LED 18. A one mil thick gold wire is die bonded between strip 34 and the cathode of the LED to provide an electrical connection therebetween.

When this spider connection-LED combination is properly positioned on or near the surface of the sapphire ball 14, the spider connections between the LED and strips 32 and 34 minimize the blockage of any light reflected back from the scanned data bits through the sapphire ball towards the phototransistor 22.

The optical resolution quality of the probe may be varied by changing the diameter of the spherical ball 14, the size of the LED, and the size of the LED connecting strips 72–75. Generally, the smaller the size of the ball, the greater the resolution of the reader.

It is thus clear that correct alignment of the LED in relation to the position of the phototransistor and the sapphire ball may be easily accomplished through use of the present invention. The circuit is secured to the interior of the probe housing, and the LED positioned correctly in the vicinity of the surface of the sapphire ball 14. The LED, after this initial positioning may be adjusted slightly in an axial direction with respect to the sapphire ball and the phototransistor in order to maximize performance of the pen reader.

Thus, a novel unitary flexible connection circuit for use in optical reading devices has been disclosed, which circuit uses flexible conductive strips encased in a transparent flexible plastic to provide a circuit connection arrangement which may be easily and quickly inserted and secured in plae in a reader probe, and which permits an LED used therein to be accurately coaxial with the center line of an associated phototransistor and the center of the sapphire ball.

Although an exemplary embodiment of the invention has been disclosed herein for purposes of illustration, it will be understood that various changes, modifications and substitutions may be incorporated in such embodiment without departing from the spirit of the invention as defined by the claims which follow.

What is claimed is:

1. A circuit connection unit for use in an electro-optical reader for bar codes or the like, the reader having a cavity in which is positioned two elements, one element being a light source element and the other element being a light-detector element in a spaced coaxial relationship with a transparent member for focusing light emitted from the light source element on to a document being positioned at one end of said electro-optical reader, comprising in combination:

a plurality of flexible electrically conductive strips;

first means located in the vicinity of one end of the connection unit for connecting one of the elements in a predetermined spaced manner to more than one of said plurality of conductive strips, said first means being shaped so as to substantially conform to said cavity of said reader adjacent the transparent member, and having a configuration such that a substantial portion of light which passes through said transparent member also passes through said first means, said first means, when operatively positioned within said cavity, supporting said one element directly adjacent said transparent member;

second means spaced away from said first means a specified distance for connecting the other of said elements to more than one of said plurality of conductive strips; and flexible insulating means for maintaining said plurality of electrically conductive strips in a spaced relationship with each other, which circuit connection unit is inserted in the electro-optical reader to provide the spaced coaxial relationship between the light source element, the light-detector element and the transparent member.

2. A circuit connection unit in accordance with claim 1, wherein said one element is a light source element, and said other element is a light-detector element.

3. A circuit connection unit in accordance with claim 2, wherein said first means includes at least one conductive connection between one conductive strip and the light source element, and another conductive connection between another conductive strip and the light source element, said one conductive strip partially bordering the light source element in a predetermined spaced manner, said first and second connections being sufficiently thin such that a substantial portion of light impinging in the area partially bordered by said one connecting element passes through said first means.

4. A circuit in accordance with claim 3, including an amplifier and wherein said plurality of electrically conductive strips are so configured and arranged as to provide conductive connections between the light-detection element and said amplifier, such that the electrical output of the light detection means, proportional to the quantity of light detected by said light detection means, in operation is applied to said amplifier.

5. A circuit connection unit in accordance with claim 4, wherein said plurality of electrically conductive strips includes connections to said light source element and to said amplifier.

6. A circuit in accordance with claim 5, wherein said light source element is a light-emitting diode.

7. A circuit connection unit in accordance with claim 6, wherein said electrically conductive strips and said insulating means are sufficiently nonresilient such that they remain substantially in place after being bent to a given angle.

8. A circuit connection unit in accordance with claim 3, wherein said first means has an outline, and wherein said outline substantially conforms to the boundary of the cavity adjacent the transparent member.

9. In combination, an electrical-optical reader probe for reading bar codes or the like, the reader probe having an internal cavity in which is positioned first and second elements, one element being a light source element and the other element being a light-detector element in a spaced, coaxial relationship with a transparent member for focusing light emitted by said light source element onto a document, said trasnparent member being positioned at one end of said electro-optical reader;

a circuit connection unit positioned within said cavity, said connection unit including a plurality of flexible, electrically conductive strips; first means located in the vicinity of one end of the connection unit for connecting said first element in a predetermined, spaced manner to more than one of said plurality of conductive strips, said first means being shaped so as to substantially conform to said internal cavity of said reader probe adjacent the transparent member, and having a configuration such that a substantial portion of light passing through said transparent member also passes through said first means, said first means, when operatively positioned in said reader probe, functioning to support said one element substantially directly adjacent said transparent member; second means spaced away from said first means a specified distance for connecting said second element to more than one of said plurality of conductive strips; and flexible insulating means to maintain said plurality of electrically conductive strips in a spaced relationship with each other, said circuit connection unit thereby providing the spaced coaxial relationship between the light source element, the light-detector element, and the transparent member.

10. A combination of claim 9, wherein said first element is a light source element, and said second element is a light-detector element.

11. A combination of claim 10, wherein said first means includes at least one conductive connection between said one conductive strip and the light source element, and another conductive connection between another conductive strip and the light source element, said one conductive strip partially bordering the light source element in a predetermined, spaced manner.

12. A combination of claim 11, wherein said internal cavity of said reader probe includes a peripheral shoulder in the vicinity of said transparent member, said first means having an outline which substantially conforms to the internal reader cavity in the vicinity of said shoulder, and which is adapted to be positioned against said shoulder, said first and second conductive connections, said peripheral shoulder, and said transparent member being configured and arranged such that a substantial portion of light passing through said transparent member also passes through said first means.

* * * * *